United States Patent [19]

Shimomura et al.

[11] Patent Number: 4,714,383

[45] Date of Patent: Dec. 22, 1987

[54] INSERT ROTARY CUTTER

[75] Inventors: Hiroshi Shimomura, Nakano; Kazuo Iizuka, Warabi; Makoto Harano; Akifumi Hamada, both of Takaoka, all of Japan

[73] Assignees: Mitsubishi Kinzoku Kabushiki Kaisha, Tokyo; Ryoco Seiki Co., Ltd., Takaoka, both of Japan

[21] Appl. No.: 887,626

[22] Filed: Jul. 21, 1986

[30] Foreign Application Priority Data

| Jul. 23, 1985 | [JP] | Japan | 60-112820[U] |
| Oct. 8, 1985 | [JP] | Japan | 60-154232[U] |
| Oct. 8, 1985 | [JP] | Japan | 60-154233[U] |
| Oct. 8, 1985 | [JP] | Japan | 60-154234[U] |

[51] Int. Cl.$^4$ .................................. B23C 5/20
[52] U.S. Cl. ........................... 407/42; 407/59; 407/62; 407/113; 408/224; 408/713
[58] Field of Search ............. 407/113, 114, 36, 42, 407/53, 54, 59, 62; 408/713, 224

[56] References Cited

U.S. PATENT DOCUMENTS

| 3,279,034 | 10/1966 | Kaiser | 407/113 |
| 3,279,035 | 10/1966 | Johnson | 407/113 |
| 3,551,978 | 1/1971 | Berry | 407/42 |
| 3,670,380 | 6/1972 | Moore et al. | 407/42 |
| 3,762,005 | 10/1973 | Erkfritz | 407/113 |
| 4,175,896 | 11/1979 | Kishinami et al. | 407/42 |
| 4,182,587 | 1/1980 | Striegl | 407/113 |
| 4,566,827 | 1/1986 | Neumueller | 407/42 |

FOREIGN PATENT DOCUMENTS

| 2259108 | 6/1973 | Fed. Rep. of Germany . |
| 111188 | 8/1979 | Japan | 407/54 |
| 145086 | 11/1979 | Japan | 407/113 |
| 168804 | 10/1982 | Japan | 407/42 |
| 60-62406 | 4/1985 | Japan . |

OTHER PUBLICATIONS

Carboly "Futurmill" Catalog p. 33, General Electric, Nov. 15, 1979.

Primary Examiner—M. Jordan
Assistant Examiner—Jerry Kearns
Attorney, Agent, or Firm—Cushman, Darby & Cushman

[57] ABSTRACT

An insert rotary cutter for processing a metal workpiece includes a cutter body of a generally circular cross-section having an axis of rotation therethrough. The cutter includes one or more cutter inserts releasably mounted on a periphery of the cutter body. The insert includes a generally quadrilateral plate defined by a front face, a rear face disposed generally parallel to the front face and four side faces. The insert has a pair of main cutting edges defined by the front face and one pair of the opposite side faces. The pair of opposite side faces serve as respective rake surfaces for the main cutting edges. Each of the rake surfaces is convexly curved in such a manner that the width of the insert between the rake surfaces is larger at a central portion of each main cutting edge than at opposite ends of the main cutting edge.

9 Claims, 43 Drawing Figures

FIG. 1 (Prior Art)    FIG. 2 (Prior Art)    FIG. 3 (Prior Art)
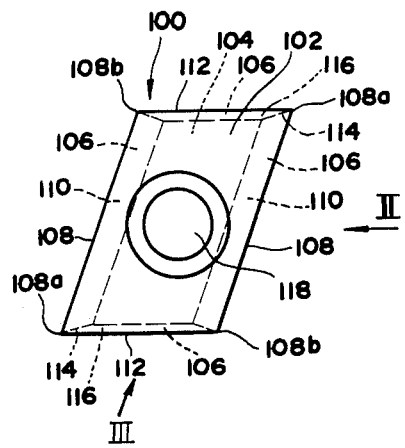
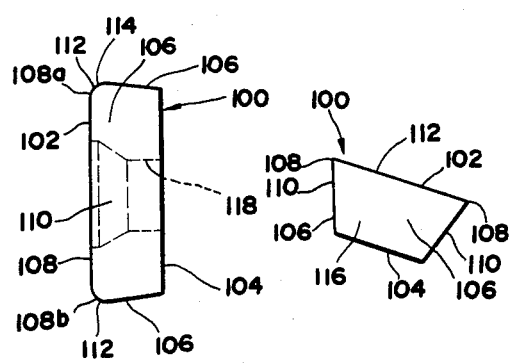
FIG. 4 (Prior Art)    FIG. 5 (Prior Art)
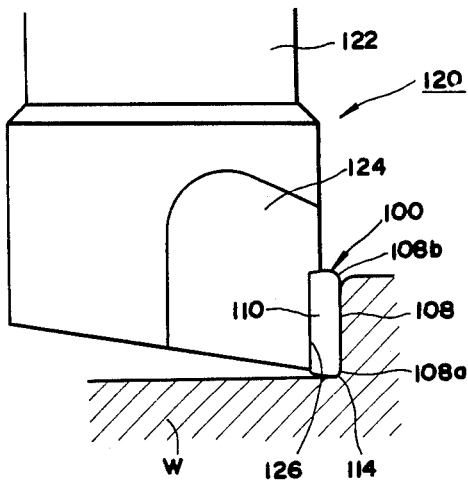
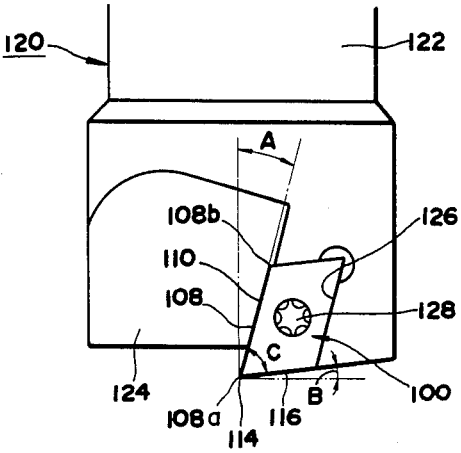

FIG. 14 (Prior Art)
FIG. 15 (Prior Art)
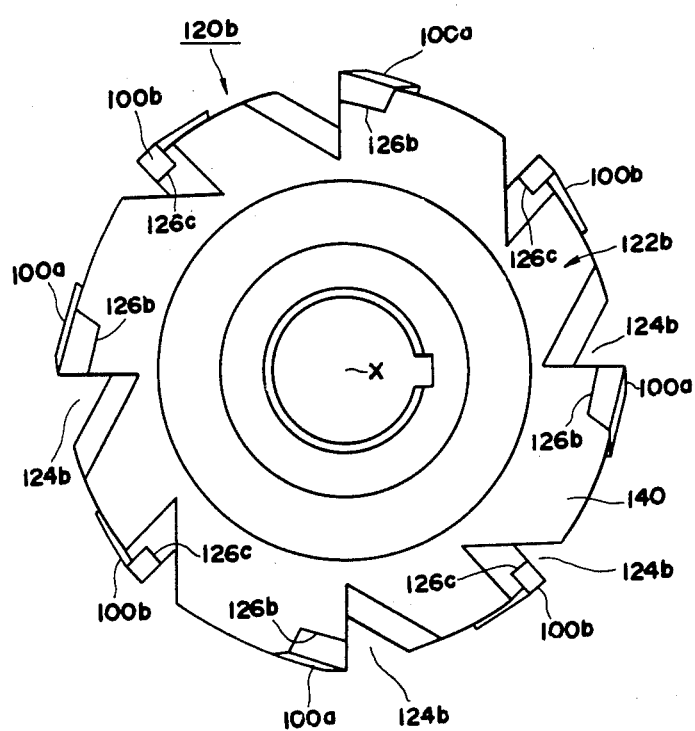
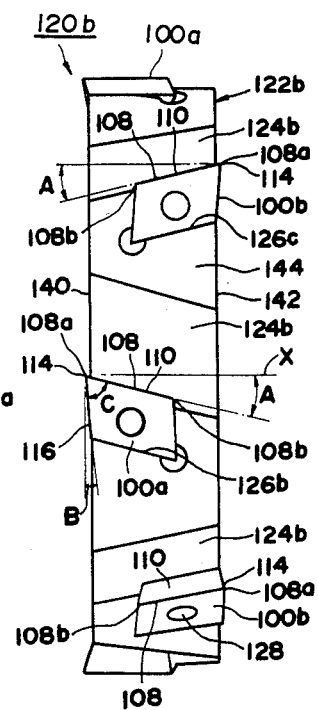

FIG. 21
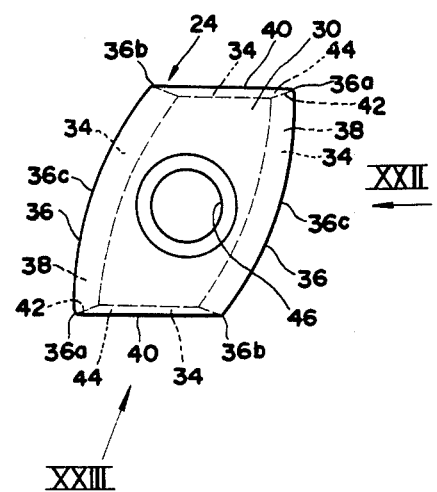
FIG. 22
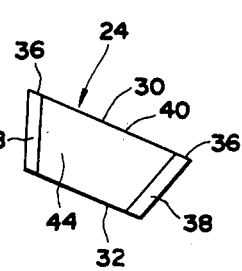
FIG. 23
FIG. 24
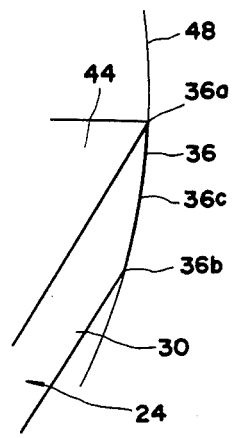
FIG. 25
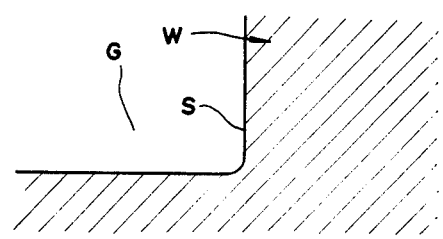

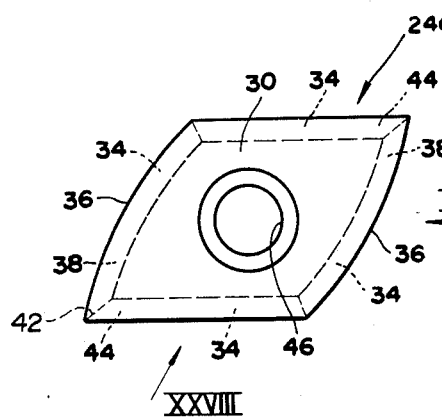
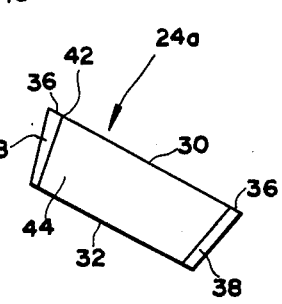
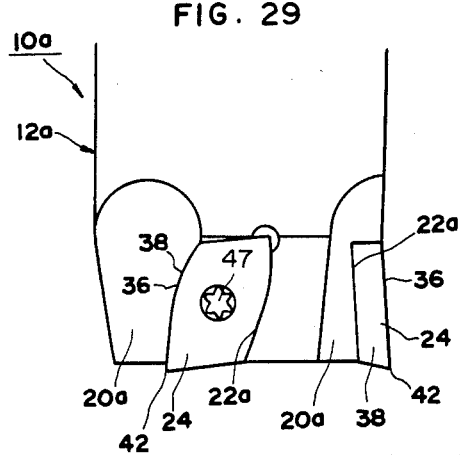
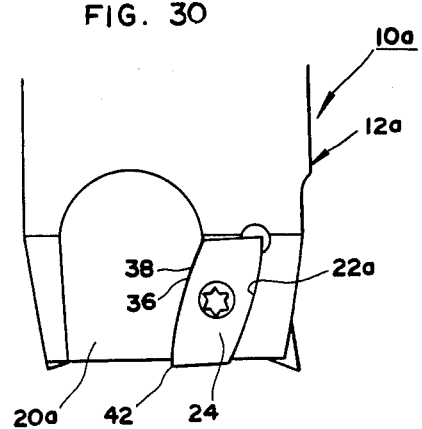
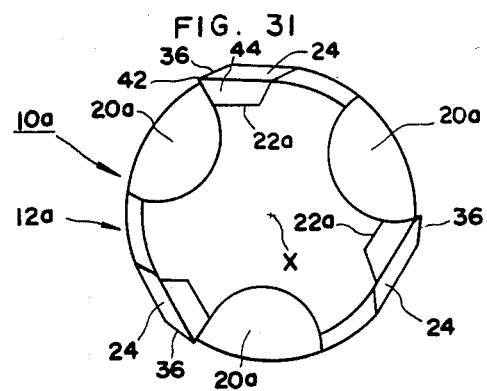

FIG. 37
FIG. 38
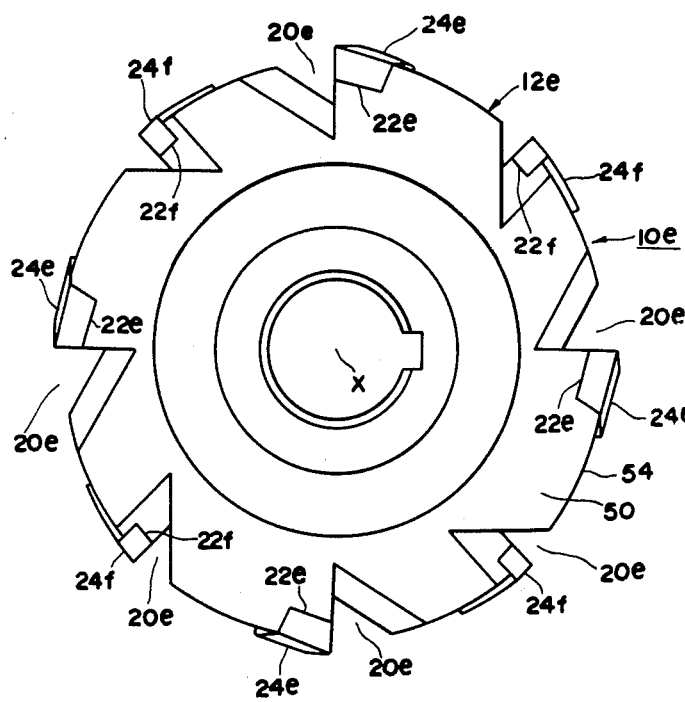
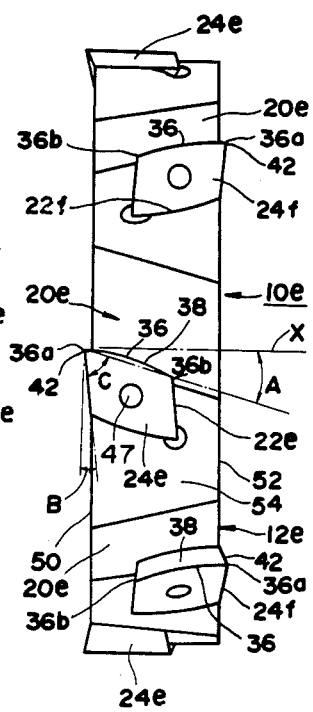

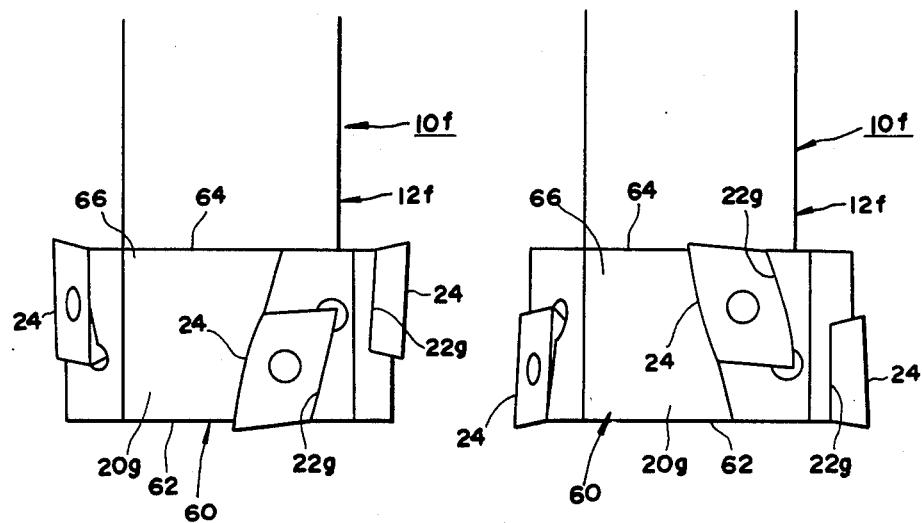
FIG. 41
FIG. 42
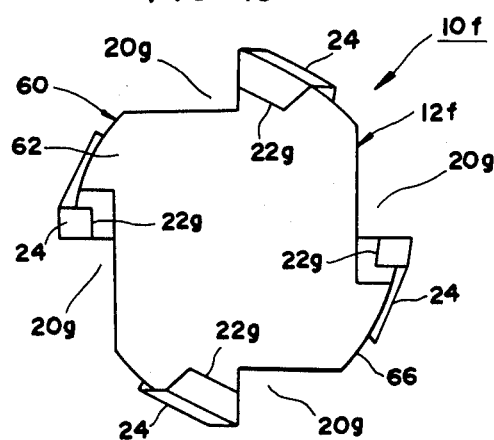
FIG. 43

INSERT ROTARY CUTTER

BACKGROUND OF THE INVENTION

1. Field of the Invention

The present invention relates to an insert rotary cutter having at least one indexable cutter insert of a positive type attached to a periphery of a cutter body thereof so as to have a positive rake in the axial direction.

2. Prior Art

Recently, an indexable cutter insert, particularly the type which comprises a quadrilateral plate including a pair of side faces serving as rake surfaces for main cutting edges, has been developed, and an insert rotary cutter having such cutter inserts has been employed as an end milling cutter, a side milling cutter, a face milling cutter or the like. One such cutter insert and several rotary cutters incorporating the same are shown in FIGS. 1 to 17 of the accompanying drawings in which the same or similar members are designated by the same reference characters.

One cutter insert 100 shown in FIGS. 1 to 3 comprises a generally parallelogrammic plate defined by a front face 102, a rear face 104 disposed generally parallel to the front face 102, and four side faces 106. The insert 100 has a pair of main cutting edges 108 defined by the front face 102 and a pair of the opposite side faces 106, and the pair of side faces 106 serve as rake surfaces 110 for the main cutting edges 108, respectively. The rake surfaces 110 are flat and sloping inwardly in a direction away from the front face 102, and the width of the insert 100 between the rake surfaces 110 is uniform along the entire length of each main cutting edge 108 from its foremost end 108a to its rearmost end 108b. Those corner portions of the insert 100 defined by the front face 102 and the other pair of opposite side faces 106 are rounded off to provide rounded portions 112, and two diagonally-disposed corner portions of the insert 100 each defined by two side faces 106 intersecting at an acute angle have respective forward portions disposed adjacent to the main cutting edges 108 and serving as corner cutting edges 114, respectively, the corner cutting edges 114 being associated with the main cutting edges 108, respectively. Those portions of the other pair of opposite side faces 106 disposed adjacent to the corner cutting edges 114 serve as relief surfaces 116 for the corner cutting edges 114, respectively. The insert 100 also includes a central mounting hole 118 formed therethrough.

An example of a cutter employing the insert 100 described above is shown in FIGS. 4 to 7. The cutter, indicated generally at 120, comprises a generally cylindrical cutter body 122 adapted to be fixedly secured to a machine spindle so that the cutter body 122 can be rotated about an axis X therethrough. Formed in a circumferential surface of the cutter body 122 at its forward end are a pocket 124 and an insert receiving recess 126, the recess 126 being adjacent to the pocket 124 and opening thereto. The insert 100 is received in the recess 126 with the rear face 104 resting on a bottom thereof, and releasably fixed thereto through a clamp screw 128 extending through the mounting hole 118 and threaded into the bottom of the recess 126. Thus, one of the main cutting edges 108 and the corner cutting edge 114 adjacent thereto are indexed in their respective cutting positions so that the indexed main cutting edge 108 is presented radially outwardly of the cutter body 122 while the indexed corner cutting edge 114 is presented axially in advance of the cutter body 122. The disposition of the insert 100 is such that the rake surface 110 for the indexed main cutting edge 108 has, as shown in FIG. 5, a positive rake angle A in the axial direction, which angle A corresponds to a mounting inclination angle of the insert 100 with respect to the cutter body 122, and that when the cutter body 122 is rotated about its axis X, the foremost and rearmost ends 108a and 108b of the indexed main cutting edge 108 generate respective circles 130 of an equal diameter disposed coaxially with the cutter body 122.

Another conventional rotary cutter 120a shown in FIGS. 9 to 12 differs from the aforementioned cutter 120 in that a cutter body 122a has a plurality of, say four, pockets 124a formed in the circumferential surface of its forward end in circumferentially and axially equally spaced relation to one another. The cutter body 122a also has a plurality of recesses 126a formed in its circumferential surface, each recess 126a being adjacent to a respective one of the pockets 124a and opening thereto. The same inserts 100 as that described above are releasably mounted in the recesses 126a, respectively, in such a manner that the inserts 100 are disposed in overlapping relation, as shown in FIG. 9, when the cutter body 122a is viewed in the circumferential direction. One of the main cutting edges 108 of each insert 100 is indexed in its peripheral cutting position so as to be presented radially outwardly of the cutter body 122a, and one of the corner cutting edges 114 of the insert 100 closest to a forward end face of the cutter body 122a is indexed in its face cutting position so as to be presented axially in advance of the cutter body 122a. The rake surface 110 for the indexed main cutting edge 108 of each insert 100 has a positive rake angle A in the axial direction, as shown in FIG. 11, and the foremost and rearmost ends 108a and 108b of each indexed main cutting edge 108 generate respective circles 130a of an equal diameter disposed coaxially with the cutter body 122a, as shown in FIG. 12, when the cutter body 122a is rotated.

Still another conventional rotary cutter 120b shown in FIGS. 14 to 17 comprises a disk-shaped cutter body 122b defined by a forward axial face 140, a rearward axial face 142 and a circumferential surface 144. The cutter body 122b includes a plurality of pockets 124b formed in its circumferential surface 144 in circumferentially spaced relation to each other. Also formed in the circumferential surface 144 of the cutter body 122b are two groups of recesses 126b and 126c disposed in staggered relation so that one group of recesses 126b open to the forward axial face 140 while the other group of recesses 126c open to the rearward axial face 142, each of the recesses 126b and 126c being also disposed adjacent to a respective one of the pockets 124b and opening thereto. Releasably mounted in each of the recesses 126b and 126b is the same insert as that described above, the inserts in the recesses 126b being designated at 100a while the inserts in the recesses 126c are designated at 100b. The insert 100a and the insert 100b are inclined in opposite circumferential directions with respect to the cutter body 122b, and one of the main cutting edges 108 of each insert 100a, 100b and the corner cutting edge 114 adjacent thereto are indexed in their respective working positions so that the rake surface 110 for the indexed main cutting edge 108 has a positive rake angle A in the axial direction. As shown in FIG. 16, the indexed main cutting edges 108 of the inserts 100a and 100b are disposed in overlapping relation when the cutter body 122b is viewed in the circumferential direction, and the foremost and rearmost ends 108a and 108b of the indexed main cutting edges 108 generate respective circles of an equal diameter disposed coaxially with the cutter body 122b when the cutter body 122b is rotated about its axis X.

In the prior art cutters 120, 120a and 120b described above, when desired to obtain better cutting performance, it is necessary to use the insert 100 designed so as to have a sufficiently large axial rake angle A. However, since the insert 100 has to be disposed so as to have an appropriate relief angle B for the indexed corner cutting edge 114, in order for the insert 100 to have the large rake angle A, the corner angle C of the indexed corner cutting edge 114 has to be made acute excessively. As a result, the strength of the insert 100 at its indexed corner cutting edge 114 is lowered, and it is likely to lead to the damage of the insert 100 in use. Furthermore, in addition to being straight, the indexed main cutting edge 108 of the insert 100 is sloping circumferentially of the cutter body 122, 122a, 122b since the insert 100 is disposed so as to have a positive rake angle A in the axial direction. Accordingly, when the cutter body 122, 122a, 122b is rotated about its axis X during cutting operation, the indexed main cutting edge 108 of the insert 100 generates a modified cylinder, the diameter of the cylinder being smaller at the intermediate portion intermediate the opposite ends thereof than of the opposite ends which are generated by the foremost and rearmost ends 108a and 108b of the main cutting edge 108. Therefore, when a workpiece W is machined with the cutter 120, 120a, 120b described above, the machined surface S has a convex shape, as illustrated in FIG. 8, or an undulatory shape, as illustrated in FIG. 13, so that the machining precision and surface finish are unsatisfactory. In addition, in the cutter 120a, 120b having a plurality of cutter inserts 100, the overall cutting resistance of the cutter is larger, and besides it is difficult to obtain sufficient rigidity due to the structure having a plurality of pockets 124a, 124b, so that the cutter body 122a, 122b is liable to chattering and vibration when in use.

SUMMARY OF THE INVENTION

It is therefore an object of the present invention to provide an insert rotary cutter in which excellent cutting performance and increased strength in cutting edges can be obtained, and in which machining precision can be enhanced without causing any chattering or vibration during cutting operation.

Another object of the present invention is to provide a cutter insert for releasably mounting in the rotary cutter and especially adapted for use therewith.

According to a first aspect of the present invention, there is provided an insert rotary cutter for processing a metal workpiece comprising a cutter body of a generally circular cross-section having an axis of rotation therethrough, and one or more cutter inserts releasably mounted on a periphery of the cutter body, the insert comprising a generally quadrilateral plate defined by a front face, a rear face disposed generally parallel to the front face and four side faces, the insert having a pair of main cutting edges defined by the front face and one pair of the opposite side faces, the pair of side faces serving as respective rake surfaces for the main cutting edges, each of the rake surfaces being convexly curved in such a manner that the width of the insert between the rake surfaces is larger at central portion of each main cutting edge than at opposite ends of the main cutting edge, the disposition of the insert with respect to the cutter body being such that one of the main cutting edges is indexed in its working position to be presented radially outwardly of the cutter body, and that the rake surface for the indexed main cutting edge has a positive rake in the axial direction.

According to a second aspect of the present invention, there is provided a cutter insert comprising a generally quadrilateral plate defined by a front face, a rear face disposed generally parallel to the front face and four side faces, the plate having a pair of main cutting edges defined by the front face and one pair of the opposite side faces, the pair of side faces serving as respective rake surfaces for the main cutting edges, each of the rake surfaces being convexly curved in such a manner that the width of the insert between the rake surfaces is larger at central portion of each main cutting edge than at opposite ends of the main cutting edge.

BRIEF DESCRIPTION OF THE DRAWINGS

FIG. 1 is a front-elevational view of a conventional cutter insert;

FIG. 2 is a view of the insert of FIG. 1 seen in the direction indicated by arrow II of FIG. 1;

FIG. 3 is a view of the insert of FIG. 1 seen in the direction indicated by arrow III of FIG. 1;

FIG. 4 is a front-elevational view of a conventional insert rotary cutter;

FIG. 5 is a side-elevational view of the cutter of FIG. 4;

FIG. 14 is an end view of still another conventional insert rotary cutter;

FIG. 15 is a front-elevational view of the cutter of FIG. 14;

FIG. 21 is a front-elevational view of a cutter insert employed in the cutter of FIG. 18;

FIG. 22 is a view of the insert of FIG. 21 seen in the direction indicated by arrow XXII of FIG. 21;

FIG. 23 is a view of the insert of FIG. 21 seen in the direction indicated by arrow XXIII of FIG. 21;

FIG. 24 is an enlarged view of the encircled portion indicated by arrow XXIV of FIG. 20;

FIG. 25 is a schematic cross-sectional view of a workpiece, showing a surface machined with the cutter of FIG. 18;

FIG. 26 is a front-elevational view of a modified cutter insert employed in the cutter of FIG. 18;

FIG. 27 is a view of the insert of FIG. 26 seen in the direction indicated by arrow XXVII of FIG. 26;

FIG. 28 is a view of the insert of FIG. 26 seen in the direction indicated by arrow XXVIII of FIG. 26;

FIG. 29 is a front-elevational view of an insert rotary cutter in accordance with a second embodiment of the present invention;

FIG. 30 is a side-elevational view of the cutter of FIG. 29;

FIG. 31 is an end view of the cutter of FIG. 29;

FIG. 37 is an end view of an insert rotary cutter in accordance with a sixth embodiment of the present invention;

FIG. 38 is a front-elevational view of the cutter of FIG. 37;

FIG. 41 is a front-elevational view of an insert rotary cutter in accordance with a seventh embodiment of the present invention;

FIG. 42 is a side-elevational view of the the cutter of FIG. 41; and

FIG. 43 is an end view of the cutter of FIG. 41.

DESCRIPTION OF PREFERRED EMBODIMENTS OF THE INVENTION

Figure 6:
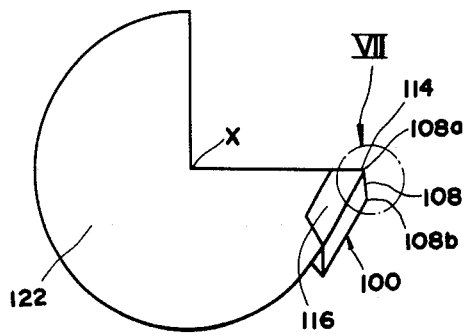
FIG. 6 is an end view of the cutter of FIG. 4.
Figure 7:
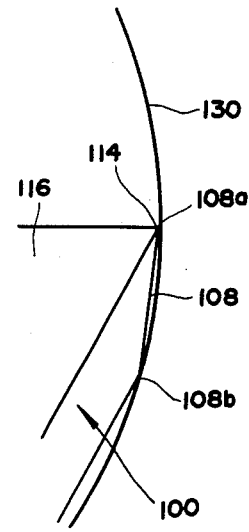
FIG. 7 is an enlarged view of the encircled portion indicated by arrow VII of FIG. 6.
Figure 8:
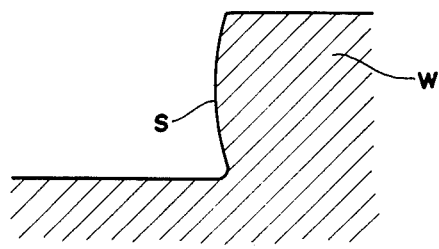
FIG. 8 is a schematic cross-sectional view of a workpiece, showing a surface machined with the cutter of FIG. 4.
Figure 9:
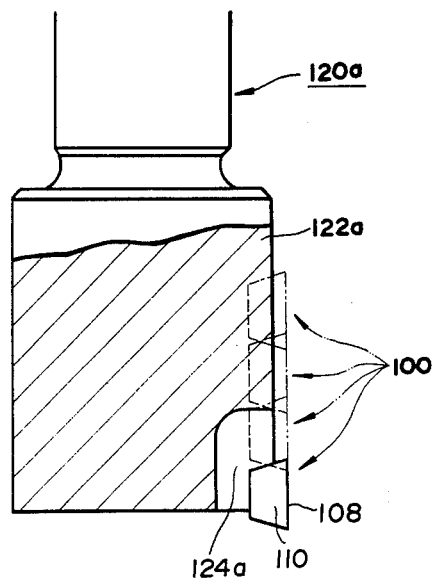
FIG. 9 is a partial cutaway front-elevational view of another conventional insert rotary cutter.
Figure 10:
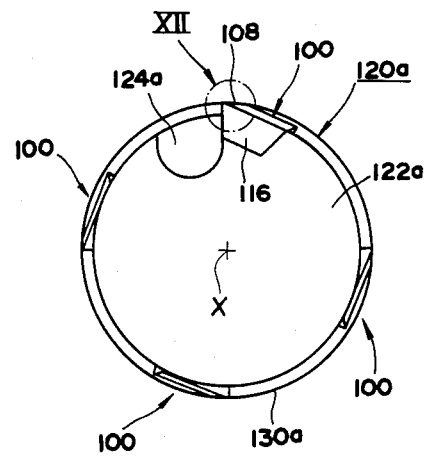
FIG. 10 is an end view of the cutter of FIG. 9.
Figure 11:
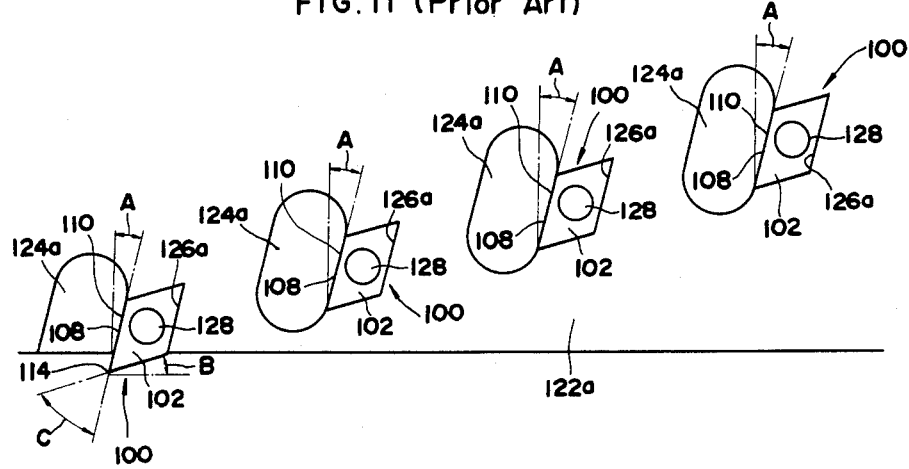
FIG. 11 is a development view of the cutter of FIG. 9, showing the disposition of inserts attached thereto.
Figure 12:
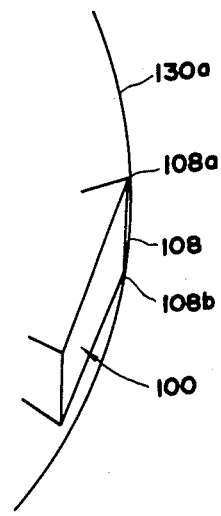
FIG. 12 is an enlarged view of the encircled portion indicated by arrow XII of FIG. 10.
Figure 13:
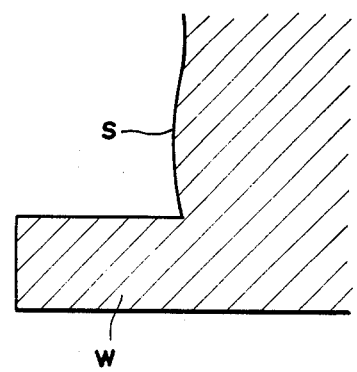
FIG. 13 is a schematic cross-sectional view of a workpiece, showing a surface machined with the cutter of FIG. 9.
Figure 16:
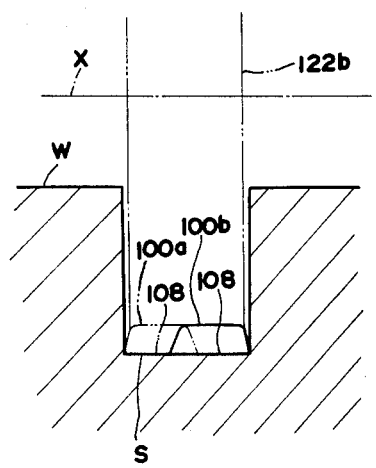
FIG. 16 is a schematic front-elevational view of the cutter of FIG. 14, showing the disposition of inserts.
Figure 17:
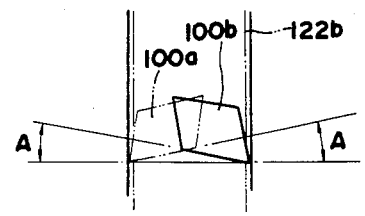
FIG. 17 is a schematic side-elevational view of the cutter of FIG. 16.
Figure 18:
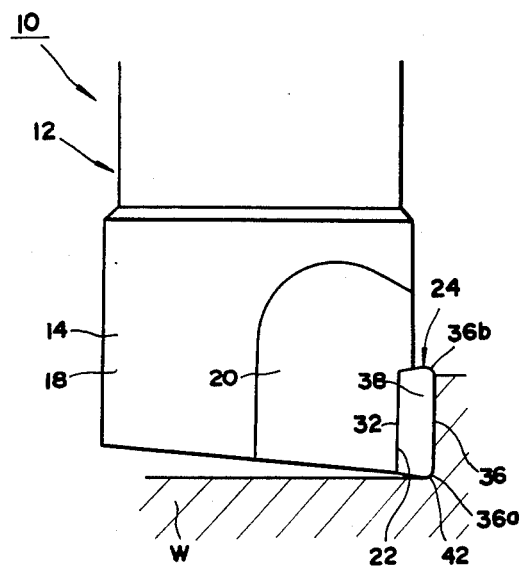
FIG. 18 is a front-elevational view of an insert rotary cutter in accordance with a first embodiment of the present invention.

Various embodiments of the present invention will now be described with reference to FIGS. 18 to 43 of the accompanying drawings in which the same reference characters are used to designate like parts or elements.

Referring to FIGS. 18 to 25, an insert rotary cutter, generally designated by the reference numeral 10, in accordance with a first embodiment of the present invention comprises a generally cylindrical cutter body 12 including a forward end 14 and a rearward end, the rearward end being adapted to be fixedly secured to a machine spindle so that the cutter body 12 can be rotated in the direction of the arrow R about an axis X therethrough. The forward end 14, which has a forward end face 16 and a circumferential surface 18, includes a pocket 20 and an insert receiving recess 22 both formed in the circumferential surface 18 and opening to the forward end face 16. The recess 22 is adjacent to the pocket 20 and opens thereto, and has a bottom facing radially outwardly of the cutter body 12. Releasably mounted in the recess 22 is an indexable cutter insert 24 of hard wear resistant material.

The insert 24, as shown in FIGS. 21 to 23, comprises a generally parallelogrammic plate defined by a flat front face 30, a flat rear face 32 disposed generally parallel to the front face 30, and four side faces 34. The insert 24 has a pair of main cutting edges 36 defined by the front face 30 and one pair of the opposite side faces 34. The pair of opposite side faces 34 are sloping inwardly in a direction away from the front face 30, and serving respective rake surfaces 38 for the main cutting edges 36. The rake surfaces 38 are convexly curved in such a manner that the width of the insert 24 between the rake surfaces 38 is the smallest at the foremost and rearmost ends 36a and 36b of each main cutting edge 36, and the largest at the central portion 36c of the main cutting edge 36. Those corner portions defined by the front face 30 and the other pair of opposite side faces 34 are rounded off to provide rounded portions 40. The other pair of opposite side faces 34 are sloping slightly inwardly in a direction away from the front face 30, and two diagonally-disposed corner portions each defined by two side faces 34 intersecting at an acute angle have respective forward portions disposed adjacent to the main cutting edges 36 and serving as corner cutting edges 42, respectively, the corner cutting edges 42 being associated with the main cutting edges 36, respectively. Those portions of the other pair of opposite side faces 34 disposed adjacent to the corner cutting edges 42 serve as relief surfaces 44 for the corner cutting edges 42, respectively. The insert 24 also includes a central mounting hole 46 formed therethrough.

Figure 19:
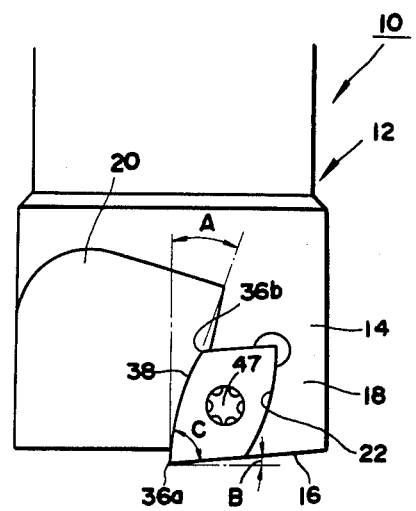
FIG. 19 is a side-elevational view of the cutter of FIG. 18.
Figure 20:
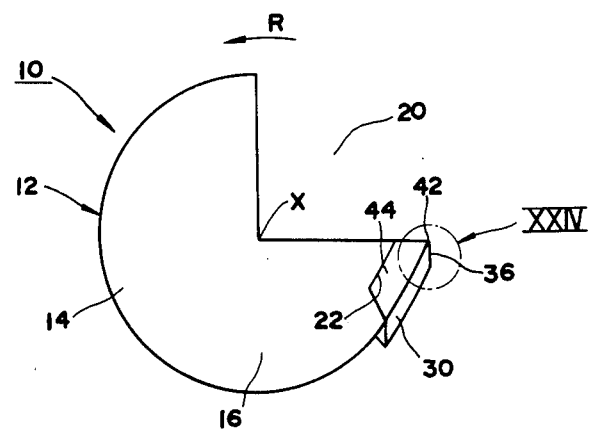
FIG. 20 is an end view of the cutter of FIG. 18.

The insert 24 is received in the recess 22 with the rear face 32 resting on a bottom thereof, and releasably fixed thereto through a clamp screw 47 extending through the mounting hole 46 and threaded into the bottom of the recess 22. Thus, one of the main cutting edges 36 and the corner cutting edge 42 adjacent thereto are indexed in their peripheral and face cutting positions, respectively, so that the indexed main cutting edge 36 is presented radially outwardly of the cutter body 12 while the indexed corner cutting edge 42 is presented axially in advance of the cutter body 12. The disposition of the insert 24 is such that the rake surface 38 for the indexed main cutting edge 36 has a suitable positive axial rake angle A as well as a suitable positive radial rake angle, and the relief surface 44 for the indexed corner cutting edge 42 has an appropriate relief angle B, as shown in FIG. 19, and that when the cutter body 12 is rotated about its axis X, the foremost and rearmost ends 36a and 36b of the indexed main cutting edge 36 generate respective circles 48 of an equal diameter disposed coaxially with the cutter body 12. For obtaining better surface finish, it is preferable for the insert 24 to have the convexly arcuate rake surfaces 38 each provided with such curvature that when the cutter body 12 is rotated about its axis X, the indexed main cutting edge 36 of the insert 24 generates a cylinder disposed coaxially with the cutter body 12, the cylinder having the same diameter as those of the circles 48 which the foremost and rearmost ends 36a and 36b generate.

In the cutter 10 described above, when the insert 24 is disposed so as to have the same mounting inclination angle as in the prior art cutter, since the insert 24 is formed so that the rake surface 38 is convexly curved, the corner angle C at the corner cutting edge 42 of the insert 24 is larger than in the prior art cutter. As a result, the strength of the insert 24 at its cutting edge is increased substantially, so that the insert 24 is not subjected to chipping and excessive wear, thereby the service life of the insert 24 being prolonged. In addition, a tangent angle defined by a tangent line at a point of the indexed main cutting edge 36 and the axis X of the cutter body 12 is positive and small at the foremost end 36a of the indexed main cutting edge 36, but is increasing progressively at an increasing rate from the foremost end 36a toward the rearmost end 36b. Accordingly, the axial rake angle A is positive and small at the foremost end 36a of the indexed main cutting edge 36, but is increasing progressively at an increasing rate from the foremost end 36a toward the rearmost end 36b. Also, the radial rake angle for the rake surface 38 is increasing progressively at an increasing rate from the foremost end 36a of the indexed main cutting edge 36 toward the rearmost end 36b thereof since the rake surface 38 is, in addition to being convexly curved, inclined rearwardly of the cutter body 12 in the circumferential direction opposite to the direction R of rotation of the cutter body 12 so that the rearmost end 36b of the indexed main cutting edge 36 is offset from the foremost end 36a in the same direction. That is to say, the rake angles in both the axial and radial directions are small at the foremost end 36a of the indexed main cutting edge 36, but are increasing progressively at an increasing rate from the foremost end 36a toward the rearmost end 36b. Therefore, the impact exerted on the foremost end 36a of the indexed main cutting edge 36 during the cutting operation is reduced substantially, and besides good cutting ability can be attained at the rearward portion of the indexed main cutting edge 36, thereby the cutter exhibiting excellent cutting performance especially in heavy-duty cutting operation such as deep cutting or high feed cutting. Further, since the rake surface 38 is convexly curved, chips produced during cutting operation are smoothly removed along the the rake surface 38 to reduce the cutting resistance, so that the cutter body 12 is not susceptible to chattering and vibration. Since the thickness of the chips produced by the cutter 10 described above is smaller than that of the chips produced by the prior cutter, the chips are cut into pieces of such a small size that they can be removed easily and smoothly. Furthermore, since the indexed main cutting edge 36 of the insert 24 is convexly curved, the indexed main cutting edge 36 generates a cylinder of a generally uniform diameter when the cutter body 12 is rotated about its axis X. Accordingly, when a workpiece W is machined with the cutter 10 to provide a groove G, as shown in FIG. 25, the opposed walls S of the groove G cut by the main cutting edge 36 is generally flat and parallel to each other, so that the machining precision and surface finish is substantially improved as compared with the prior cutter. Particularly in the case where the rake surfaces 38 are convexly arcuate with such curvature as mentioned above, the machined surface S is exactly flat, as shown in FIG. 25, so that the machining precision and surface finish is further improved.

FIGS. 26 to 28 show a modified cutter insert 24a employed in the cutter 10 described above which insert 24a differs from the aforementioned insert 24 in that it is of a generally rhombic shape. Also in this insert 24a, a pair of opposite side faces 34 serving as rake surfaces 38 for main cutting edges 36 are convexly curved, and preferably convexly arcuate with prescribed curvature.

FIGS. 29 to 31 show a rotary cutter 10a in accordance with a second embodiment of the present invention. The cutter 10a differs from the aforementioned cutter 10 in that a forward end of a cutter body 12a thereof includes a plurality of, say three, pockets 20a formed in its circumferential surface in circumferentially equally spaced relation to each other. The forward end also includes a plurality of recesses 22a formed in its circumferential surface, each recess 22a being disposed adjacent to a respective one of the pockets 20a and opening thereto. The same parallelogrammic inserts 24 as that in the first embodiment are releasably mounted in the recesses 22a, respectively, and disposed to operate at a common circumferential line. One of the main cutting edges 36 of each insert 24 is indexed in its cutting position so as to be presented radially outwardly of the cutter body 12a, and one of the corner cutting edges 42 of each insert 24 is indexed in its cutting position so as to be presented axially in advance of the cutter body 12a.

Figure 32:
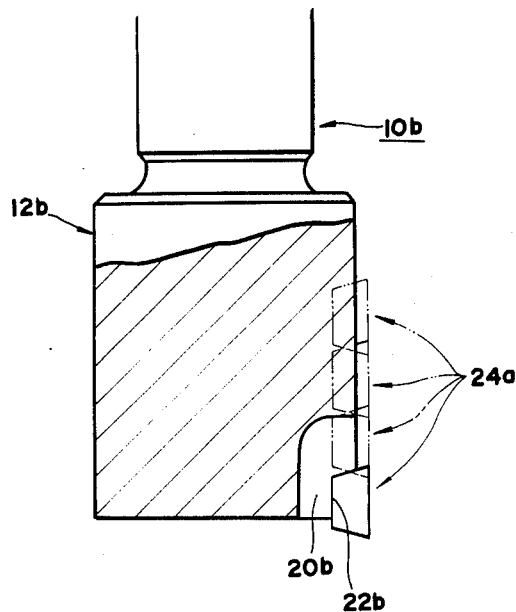
FIG. 32 is a partial cutaway front-elevational view of an insert rotary cutter in accordance with a third embodiment of the present invention.
Figure 33:
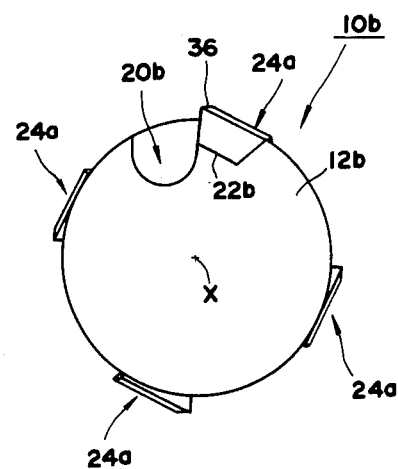
FIG. 33 is an end view of the cutter of FIG. 32.
Figure 34:
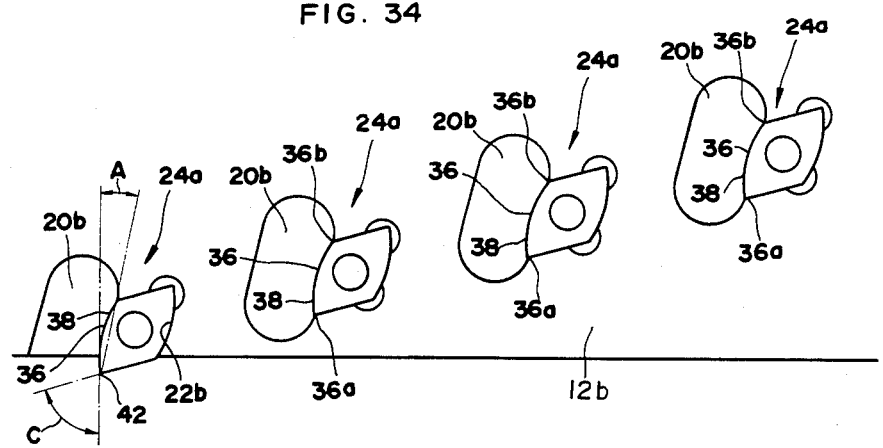
FIG. 34 is a development view of the cutter of FIG. 32.

FIGS. 32 to 34 show a rotary cutter 10b in accordance with a third embodiment of the present invention which differs from the cutter 10 of the first embodiment in that a cutter body 12b includes a plurality of, say four, pockets 20b formed in the circumferential surface of its forward end in circumferentially and axially equally spaced relation to one another. The cutter body 12b also includes a plurality of recesses 22b formed in its circumferential surface, each recess 22b being disposed adjacent to a respective one of the pockets 20b and opening thereto. The aforementioned rhombic inserts 24a are releasably mounted in the recesses 22b, respectively, in such a manner that the inserts 24a are disposed in overlapping relation, as shown in FIG. 32, when the cutter body 12b is viewed in the circumferential direction. One of the main cutting edges 36 of each insert 24a is indexed in its peripheral cutting position so as to be presented radially outwardly of the cutter body 12b, and one of the corner cutting edges 42 of the insert 24a closest to a forward end face of the cutter body 12b is indexed in its face cutting position so as to be presented axially in advance of the cutter body 12b. In the cutter 10b, the indexed main cutting edges 36 of the inserts 24a generate a cylinder of a generally uniform diameter disposed coaxially with the cutter body 12b, when the cutter body 12b is rotated about its axis X.

Figure 35:
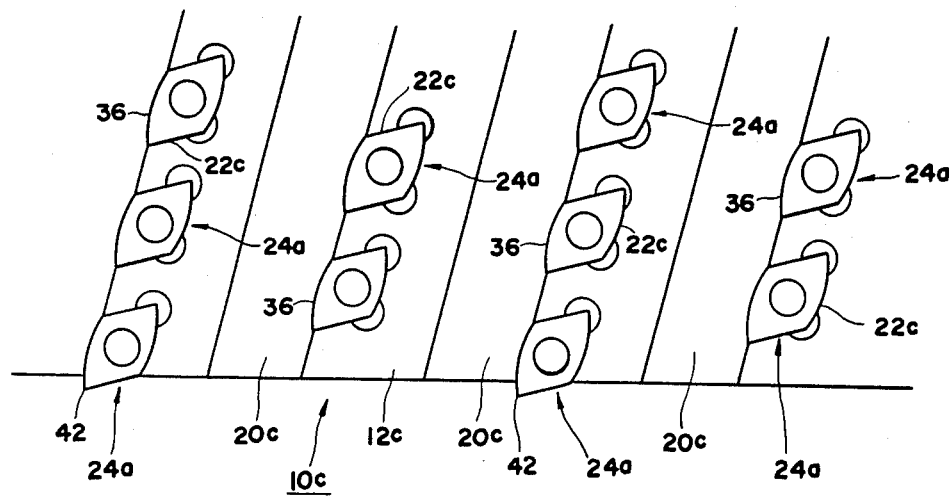
FIG. 35 is a view similar to FIG. 34, but showing an insert rotary cutter in accordance with a fourth embodiment of the present invention.

FIG. 35 shows a rotary cutter 10c in accordance with a fourth embodiment of the present invention. A cutter body 12c thereof includes a plurality of, say four, pockets 20c formed in its circumferential surface in circumferentially equally spaced relation to one another. Four groups of recesses 22c are formed in the circumferential surface of the cutter body 12c, each group of recesses 22c being disposed adjacent to a respective one of the pockets 20c and opening thereto. The recesses 22c of each group are displaced circumferentially and spaced axially from each other. The rhombic cutter inserts 24a are releasably mounted in the recesses 22c, respectively, in such a manner that the inserts 24a are disposed in overlapping relation when the cutter body 12c is viewed in the circumferential direction. One of the main cutting edges 36 of each insert 24a is indexed in its peripheral cutting position, and one of the corner cutting edges 42 of each of the two inserts 24a closest to a forward end face of the cutter body 12c is indexed in its face cutting position. All the inserts 24a are disposed so as to have the positive rake angles A in the axial direction.

Figure 36:
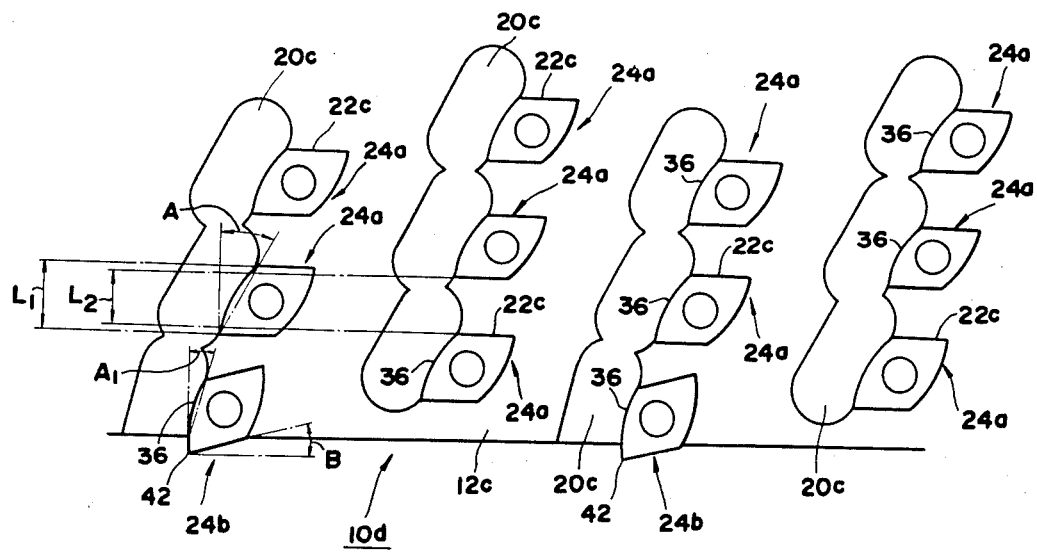
FIG. 36 is a view similar to FIG. 34, but showing an insert rotary cutter in accordance with a fifth embodiment of the present invention.

FIG. 36 shows a rotary cutter 10d in accordance with a fifth embodiment of the present invention. The cutter 10d differs from the cutter 10c of the fourth embodiment in that the two inserts 24b disposed closest to the forward end face of the cutter body 12c has smaller axial rake angles $A_1$ than the remaining inserts 24a have. The rake angles $A_1$ of the two inserts 24b have to be determined in consideration of the relief angles B for the indexed corner cutting edges 42 thereof, respectively, whereas the rake angles A for the remaining inserts 24a can be selected without considering the relief angles for the corner cutting edges. Therefore, in order to obtain good cutting performance, the rake angles A for the latter inserts 24a can be made larger, as far as the length $L_1$ of each insert 24a in the axial direction is selected to be larger than the intervening distance $L_2$ between the adjacent two axially-spaced inserts 24a each spaced circumferentially from the insert 24a for maintaining overlapping relation of the inserts when the cutter body 12c is viewed in the circumferential direction.

Figure 39:
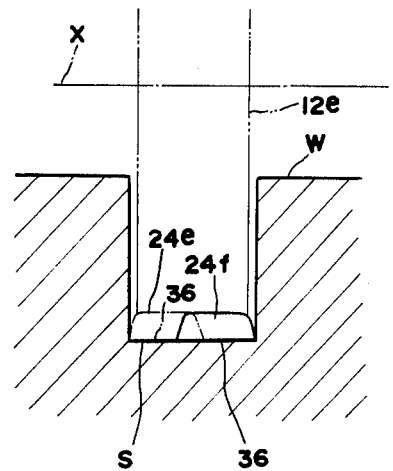
FIG. 39 is a schematic front-elevational view of the cutter of FIG. 37, but showing the disposition of inserts.
Figure 40:
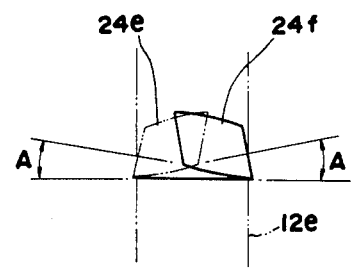
FIG. 40 is a schematic side-elevational view of the cutter of FIG. 39.

FIGS. 37 to 40 show a rotary cutter 10e in accordance with a sixth embodiment of the present invention which comprises a disk-shaped cutter body 12e defined by forward and rearward axial faces 50 and 52 and a circumferential surface 54 lying between the forward and rearward axial faces 50 and 52. The cutter body 12e includes a plurality of pockets 20e formed in a circumferential surface 54 in circumferentially equally spaced relation to each other. Also formed in the circumferential surface 54 of the cutter body 12e are first and second groups of recesses 22e and 22f disposed in staggered relation so that the first group of recesses 22e open to the forward axial face 50 while the second group of recesses 22f open to the rearward axial face 52, each of the recesses being also disposed adjacent to a respective one of the pockets 20e and opening thereto. The parallelogrammic inserts are releasably mounted in the recesses 22e and 22f, respectively, the inserts disposed in the first group of recesses 22e being designated at 24e while the inserts disposed in the second group of recesses 22f are designated at 24f. The insert 24e and the insert 24f are inclined in opposite circumferential directions with respect to the cutter body 12e, and one of the main cutting edges 36 of each insert and the corner cutting edge 42 adjacent thereto are indexed in their working positions so that the rake surface 38 for the indexed main cutting edge 36 has a positive rake angle A in the axial direction. The inserts 24e and 24f are disposed in overlapping relation, as shown in FIG. 39, when the cutter body 12e is viewed in the circumferential direction, and the indexed main cutting edges 36 of the inserts 24e and 24f generate a cylinder disposed coaxially with the cutter body 12e, when the cutter body 12e is rotated.

FIGS. 41 to 43 show a rotary cutter 10f in accordance with a seventh embodiment of the present invention which comprises a cutter body 12f having a disk-shaped base portion 60 of a circular cross-section integrally formed at a forward end thereof in coaxial relation thereto. The base portion 60 has a forward axial face 62, a rearward axial face 64 and a circumferential surface 66 lying between the forward and rearward axial faces 62 and 64. A plurality of pockets 20g and recesses 22g are formed in the circumferential surface 66 of the base portion 60, and a plurality of parallelogrammic inserts 24 are releasably mounted in the recesses 22g, respectively. The disposition of the pockets 20g, recesses 22g and inserts 24 with respect to the base portion 60 are basically the same as its disposition with respect to the cutter body 12e in the cutter 10e of the sixth embodiment. The cutter 10f is employed for forming T-shaped grooves or the like in a workpiece.

In each of the cutters in accordance with the second to seventh embodiments described above, when the insert is disposed so as to have the same mounting inclination angle as in the prior art cutter, since the insert is formed so that the rake surface is convexly curved, the corner angle at the corner cutting edge of the insert is larger than in the prior art cutter. As a result, the strength of the insert at its cutting edge is increased substantially, so that the insert is not subjected to chipping and excessive wear, thereby the service life of the insert being prolonged. In addition, a tangent angle defined by a tangent line at a point of the indexed main cutting edge and the axis of the cutter body is positive and small at the foremost end of the indexed main cutting edge, but is increasing progressively at an increasing rate from the foremost end toward the rearmost end. Accordingly, the axial rake angle is positive and small at the foremost end of the indexed main cutting edge, but is increasing progressively at an increasing rate from the foremost end toward the rearmost end. Also, the radial rake angle for the rake surface is increasing progressively at an increasing rate from the foremost end of the indexed main cutting edge toward the rearmost end thereof since the rake surface is, in addition to being convexly curved, inclined rearwardly of the cutter body in the circumferential direction opposite to the direction of rotation of the cutter body so that the rearmost end of the indexed main cutting edge is offset from the foremost end in the same direction. That is to say, the rake angles in both the axial and radial directions are small at the foremost end of the indexed main cutting edge, but are increasing progressively at an increasing rate from the foremost end toward the rearmost end. Therefore, the impact exerted on the foremost end of the indexed main cutting edge during the cutting operation is reduced substantially, and besides good cutting ability can be attained at the rearward portion of the indexed main cutting edge, thereby the cutter exhibiting excellent cutting performance especially in heavy-duty cutting operation such as deep cutting or high feed cutting. Further, since the rake surface is convexly curved and the thickness of the chips produced by the cutter in accordance with the embodiments is smaller than that of the chips produced by the prior cutter, chips produced during cutting operation are cut into pieces of an appropriate size and smoothly removed along the rake surface to reduce the cutting resistance, so that the cutter body is not susceptible to chattering and vibration. This is especially true with the cutter having a plurality of inserts which cutter is liable to chattering and vibration. Furthermore, since the indexed main cutting edge of the insert is convexly curved, the indexed main cutting edge generates a cylinder of a generally uniform diameter when the cutter body is rotated about its axis. Accordingly, when a workpiece is machined with the cutter to provide a groove or the like, the surface cut by the main cutting edge is generally flat, so that the machining precision and surface finish is substantially improved as compared with the prior cutter.

Obviously many modifications and variations of the present invention are possible in the light of the above teachings. It is therefore to be understood that within the scope of the appended claims, the invention may be practiced otherwise than as specifically described.

What is claimed is:

1. An insert rotary cutter for processing a metal workpiece comprising:
a cutter body of a generally circular cross-section having an axis of rotation therethrough; and
one or more cutter inserts each comprising a generally quadrilateral plate defined by a front face, a rear face disposed generally parallel to said front face and two opposed pairs of side faces, and having a thickness between said front and rear faces smaller than a width between a respective one of said opposed pairs of side faces, said insert having a pair of main cutting edges defined by intersections of said front face with said opposed pair of side faces, each of said one opposed pair of side faces sloping inwardly in a direction away from said front face and being convexly curved along their respective lengths whereby said pair of main cutting edges are convexly curved, said insert being releasably mounted on a periphery of said body in such a manner that one of said main cutting edges is indexed in a peripheral cutting position, and that said front face is facing radially outwardly of said body so that one of said opposed pair of side faces serves as a rake surface for said indexed main cutting edge, said rake surface having a foremost and a rearmost end, said rake surface for said indexed main cutting edge being disposed so as to have a positive axial rake angle and a radial rake angle both increasing progressively from said foremost end of the rake surface toward said rearmost end thereof.

2. An insert rotary cutter according to claim 1, in which said rake surfaces of said insert are convexly arcuate with such curvature that when said cutter body is rotated about said axis of rotation, said indexed main cutting edge generates a cylinder disposed coaxially with said cutter body.

3. An insert rotary cutter according to claim 1, in which a plurality of said inserts are mounted on the periphery of said cutter body in circumferentially equally spaced relation to each other to operate at a common circumferential line.

4. An insert rotary cutter according to claim 1, in which a plurality of said inserts are mounted on the periphery of said cutter body in circumferentially and axially spaced relation to each other in such a manner that said indexed main cutting edges of said inserts are in series axially of said cutter body as viewed circumferentially of said cutter body.

5. An insert rotary cutter according to claim 1, in which said cutter body includes a disk-shaped portion defined by a forward axial face, a rearward axial face and a circumferential surface lying between said forward and rearward axial faces, a plurality of said inserts being mounted on the periphery of said cutter body in staggered relation so as to be disposed alternately adjacent to said forward axial face and said rearward axial face, the insert adjacent to said forward axial face and the insert adjacent to said rearward axial face being inclined in opposite circumferential directions with respect to said cutter body.

6. An insert rotary cutter according to claim 1, claim 2, claim 3, claim 4, or claim 5, in which said insert has a central mounting hole passing therethrough in the direction of thickness thereof, said insert being mounted on the periphery of said cutter body through a mounting screw extending through said mounting hole and threaded into said cutter body.

7. An insert rotary cutter according to claim 6, in which said cutter body includes a recess formed in its periphery for accommodating each said insert, said cutter body also including a pocket to which said recess is disposed adjacent and opening, said insert being disposed in said recess with said rear face resting on a bottom of said recess.

8. An insert rotary cutter for processing a metal workpiece comprising:
a cutter body of a generally circular cross-section having an axis of rotation therethrough; and
at least one cutter insert releasably mounted on a periphery of said body, said insert comprising a generally quadrilateral plate defined by a front face, a rear face disposed generally parallel to said front face and four side faces, said insert having a pair of main cutting edges defined by intersections of said front face with one opposite pair of said side faces, said one opposite pair of side faces serving as respective rake surfaces for said main cutting edges, each of said rake surfaces being convexly curved in such a manner that a width of said insert between said rake surfaces is larger at a central portion of each main cutting edge than at an opposite end of said main cutting edge;
the disposition of said insert with respect to said body being such that one of said main cutting edges is indexed in its working position to be disposed radially outwardly of said cutter body, and that said rake surface for said indexed main cutting edge has a positive rake in the axial direction, said cutter body having a plurality of said inserts mounted on the periphery of said cutter body in circumferentially and axially spaced relation to each other in such a manner that said indexed main cutting edges of said inserts are in series axially of said cutter body as viewed circumferentially of said cutter body, the one of said inserts closest to a forward end face of said cutter body being disposed so as to have the positive axial rake angle smaller than the remaining inserts have.

9. An insert rotary cutter according to claim 3, claim 4, claim 8 or claim 6, in which said rake surfaces of each insert are convexly arcuate with curvature such that when said cutter body is rotated about said axis of rotation, the indexed main cutting edges of said inserts cooperate to generate a cylinder disposed coaxially with said cutter body.

* * * * *